Figure 3:
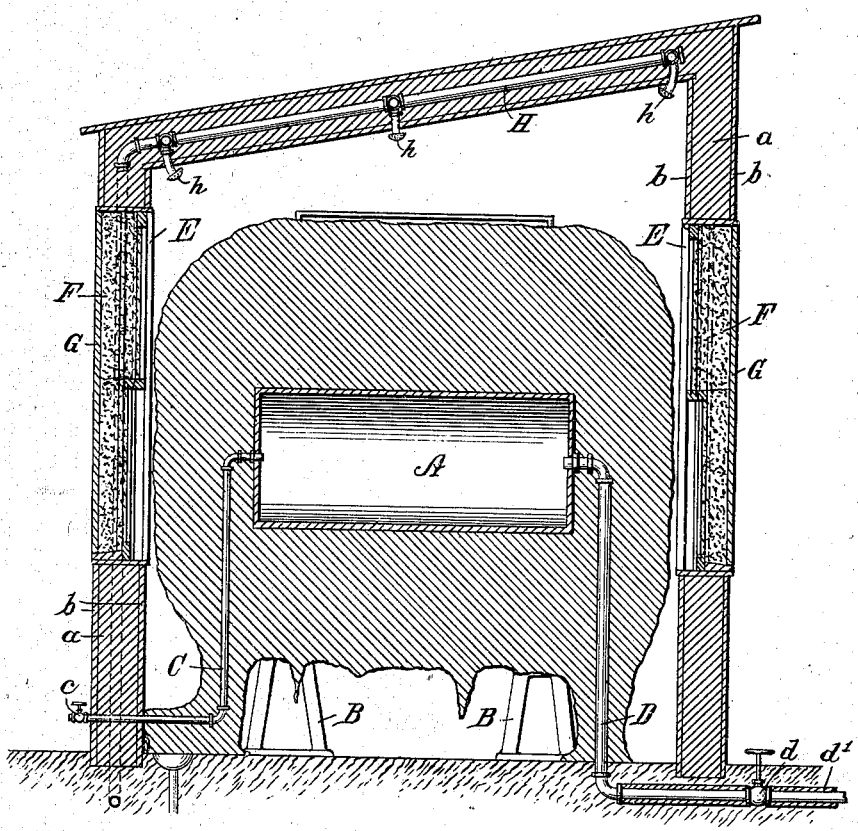

No. 738,761. PATENTED SEPT. 15, 1903.
W. G. BLOSS.
APPARATUS FOR COOLING AIR.
APPLICATION FILED JAN. 28, 1903.
NO MODEL. 2 SHEETS—SHEET 1.
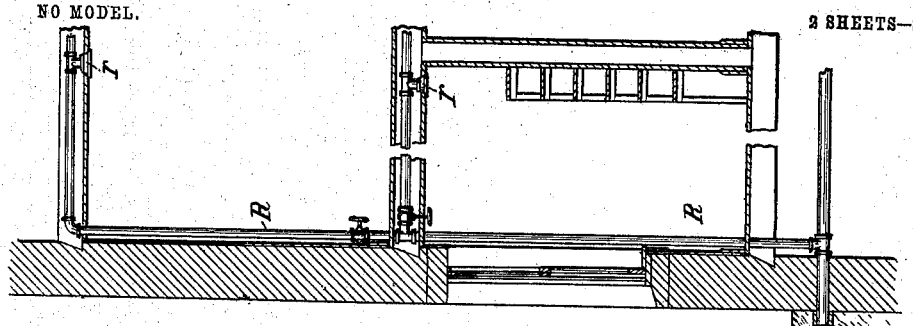
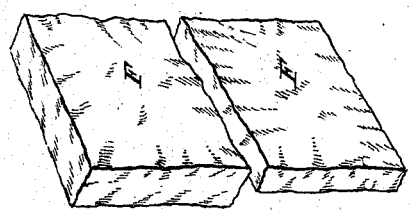
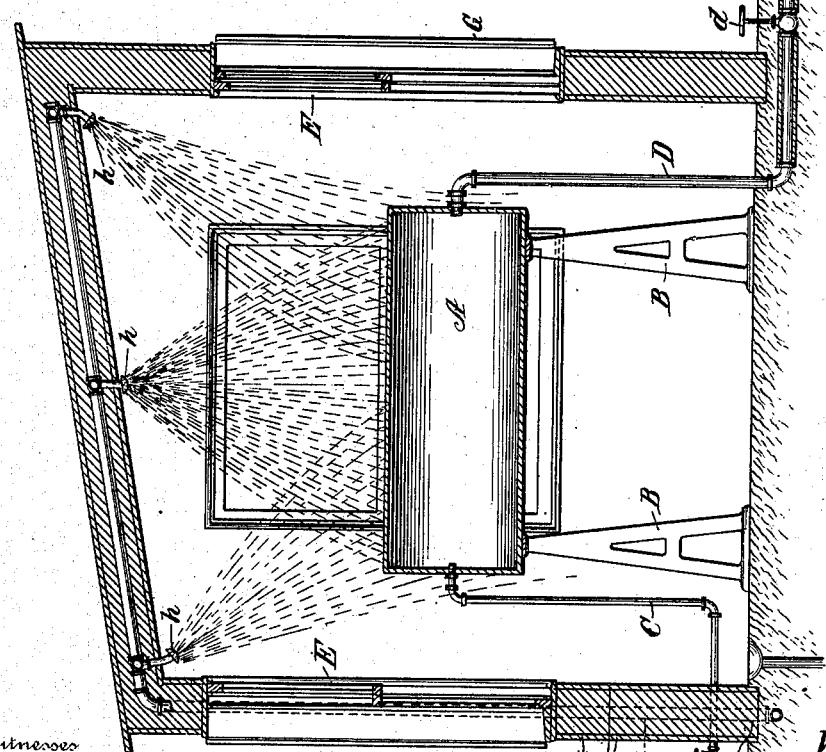

No. 738,761. PATENTED SEPT. 15, 1903.
W. G. BLOSS.
APPARATUS FOR COOLING AIR.
APPLICATION FILED JAN. 28, 1903.
NO MODEL. 2 SHEETS—SHEET 2.

Witnesses Inventor
W. G. Bloss,
By Baldwin Davidson & Wight
his Attorneys

No. 738,761. Patented September 15, 1903.

UNITED STATES PATENT OFFICE.

WILLIAM G. BLOSS, OF PONTIAC, ILLINOIS.

APPARATUS FOR COOLING AIR.

SPECIFICATION forming part of Letters Patent No. 738,761, dated September 15, 1903.

Application filed January 28, 1903. Serial No. 140,944. (No model.)

*To all whom it may concern:*

Be it known that I, WILLIAM G. BLOSS, a citizen of the United States, residing at Pontiac, in the county of Livingston and State of Illinois, have invented certain new and useful Improvements in Apparatus for Cooling Air, of which the following is a specification.

The object of my invention is to provide apparatus for cooling air by means of ice formed in freezing weather by natural cold and preserved in a housing of non-conducting material.

In carrying out my invention I provide an air-chamber which is elevated on standards and inclosed by a housing of such dimensions as to afford a large space around the air-chamber for the formation of ice and so constructed as to permit the free access of cold air around the air-chamber when desired to inclose the chamber with non-conducting material, so as to insulate the ice from the action of heat when the temperature of the outside air rises. Preferably the housing consists for the most part of non-conducting material, such as straw or sawdust, inclosed between boards; but windows are provided which when raised admit cold air, but which may be readily closed and packed with pads of non-conducting material. Water is conveyed to the freezing-house by means of a pipe provided with sprinklers arranged above the air-chamber, which cause the water to be delivered around and upon the chamber in the form of a spray or fog, which gradually freezes, the air-chamber ultimately being completely surrounded by a solid mass of ice, which cools the air in the chamber and maintains it at a low temperature as long as the ice is prevented from melting, which may be for a very long time, owing to its great size and to the housing by which it is surrounded.

The cold air may be drawn from the air-chamber whenever needed by means of suitable pumping apparatus operated either by hand or by power, and the air may be distributed to the rooms of dwellings, to packing-houses, and to other places where a low temperature is desired. I also lead a pipe from the pump to a dwelling and equip the dwelling with a system of pipes provided with outlets in the different rooms, from which cold air may be discharged in such manner as to cool the temperature without producing a draft.

In the accompanying drawings, Figure 1 is a diagram illustrating my invention. It shows in vertical central section my improved apparatus for cooling air connected with a house provided with a pipe system for distributing cold air. Fig. 2 is a view showing in perspective packing-pads which may be used for closing in the windows. Fig. 3 shows a vertical central section of the air-cooling apparatus with the windows closed and packed and a mass of ice formed around the air-chamber.

The air-chamber A may be made of any suitable shape and size and of any suitable material. It is preferably a metallic cylinder of large dimensions, supported by standards B and provided with an inlet-pipe C and an air-discharge pipe D. The air-chamber should be located in some suitable place where it may be exposed to the lowest natural temperature obtainable, and it is inclosed by a housing which when closed up will protect the inside from a high temperature on the outside, but which may be readily opened up to admit cold air to the interior of the house when it is desired to form ice around the air-chamber. As shown, the walls and roof of the house are made very thick, non-conducting material *a*—such as straw, sawdust, &c.—being interposed between boards or the like *b*. Large windows E are provided, which may be opened by raising the sashes, as shown in Fig. 1. When the windows are closed, pads F, of felt or of sawdust or straw inclosed in cloth, may be placed in the window-openings and held in place by the shutters G in the manner indicated in Fig. 3.

In the roof above the air-chamber A is arranged a water-pipe H, having branches provided with roses or sprinklers *h*. The pipe H is inclosed in the non-conducting material of the roof and connects with a supply-pipe I, also inclosed in the non-conducting material of the housing and entering the ground at *x*. In this way I prevent the water in the pipe from freezing when it is not running. Of course when the water is running there is no tendency for the pipes to freeze. Any suitable means may be provided for regulating the flow of water through the pipes I and H—such as a valve or cock on the outside of the building. The sprayers or sprinklers are preferably arranged to deliver water in the manner indicated in Fig. 1. Ice is first formed on the outer surface of the chamber or cylinder A, and then successive layers are formed until a practically solid mass of ice is made to inclose the air-chamber to nearly fill the space between the air-chamber and the walls of the housing in the manner indicated in Fig. 3.

It will be understood, of course, that the windows are so arranged as to permit air to freely enter the inclosure, so that the temperature of the air inside the housing will be practically the same as that on the outside. It will also be understood that an attendant may be at hand to regulate the supply of water while the freezing operation is progressing. If the water is fed too fast, it may be turned off until the ice has sufficiently formed around the air-chamber to allow of the addition of more water to form more ice. At any rate the supply of water may be properly regulated, so that finally a large solid mass of ice, like that shown in Fig. 3, may be formed around the air-chamber. When this is done, the windows should be closed, the pads placed in position, and the shutters closed against the pads, as indicated in Fig. 3.

The air-inlet pipe C is provided outside the building with a valve $c$ and the air-outlet pipe D is provided outside the building with a valve $d$. The pipe D may be carried underground to such a depth that no covering may be required in order to keep down the temperature of the pipes; but if the air-discharge pipe is arranged close to the surface a covering of some non-conducting material $d'$ may be used.

The pipe D connects with a pump P, which may be a rotary pump of ordinary construction, operated by power applied to a pulley $p$, or the pump may be worked by hand. Q indicates the pipe leading from the pump and connecting with pipes in a building, from which cold air is discharged into the rooms or compartments. The pipes R may be arranged in any suitable way in the building, the discharge-openings $r$ preferably being arranged at the top of the rooms or compartments, so that the cold air may be allowed to fall gradually into the rooms, and thus reduce the temperature without producing a draft. The warm air may be reduced in temperature in this way or may be displaced, the warm air passing out through the windows or through the cracks around the windows.

It is obvious that many modifications may be made in the manner of carrying out my invention. The cold air may, according to my invention, be conveyed and distributed in various ways. I have found it to be entirely practicable to surround an air-chamber with a large mass of ice during zero or freezing weather in the winter and to preserve this ice around the air-chamber until and during the summer months and to be able to draw cold air from the air-chamber whenever required. Of course when the air is pumped out of the air-chamber a vacuum will be produced; but I have provided a pipe C, by means of which the air-chamber may be refilled with enough air to fill the chamber and to be there reduced in temperature. I preferably do not draw the air continuously through the air-chamber, but fill such chamber from time to time, allowing the air to remain in the chamber long enough to have its temperature sufficiently reduced to be conveyed a suitable distance and to be distributed with cooling effect wherever needed.

I claim as my invention—

1. An apparatus for cooling air by means of ice formed by the natural temperature in zero or freezing weather, comprising an air-chamber, a housing of non-conducting material therefor, provided with openings to allow cold air to freely enter and surround the air-chamber, means for spraying water within the housing around the air-chamber while the latter is exposed to the outside temperature, means for closing the openings with non-conducting material after a mass of ice is formed around the air-chamber, and pipes for admitting air to and conveying it from the air-chamber.

2. The combination of an air-chamber, standards supporting it at an elevation, a housing of non-conducting material surrounding the air-chamber, water-pipes arranged in the non-conducting material of the housing, sprinklers branching from the water-pipes for spraying water around the air-chamber, and pipes for conveying air to and carrying it from the air-chamber.

In testimony whereof I have hereunto subscribed my name.

WILLIAM G. BLOSS.

Witnesses:
 LLOYD B. WIGHT,
 A. M. PARKINS.